United States Patent
Lokhandwala

(10) Patent No.: US 9,302,227 B2
(45) Date of Patent: Apr. 5, 2016

(54) MEMBRANE SEPARATION ASSEMBLY FOR FUEL GAS CONDITIONING

(71) Applicant: Kaaeid A. Lokhandwala, Fremont, CA (US)

(72) Inventor: Kaaeid A. Lokhandwala, Fremont, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 0 days.

(21) Appl. No.: 14/538,340

(22) Filed: Nov. 11, 2014

(65) Prior Publication Data

US 2015/0059577 A1    Mar. 5, 2015

Related U.S. Application Data

(63) Continuation-in-part of application No. 13/224,891, filed on Sep. 2, 2011, now Pat. No. 8,906,143.

(51) Int. Cl.

| | |
|---|---|
| *B01D 53/22* | (2006.01) |
| *B01D 63/12* | (2006.01) |
| *B01D 46/00* | (2006.01) |
| *B01D 46/24* | (2006.01) |
| *B01D 50/00* | (2006.01) |
| *B01D 63/10* | (2006.01) |

(Continued)

(52) U.S. Cl.
CPC .............. *B01D 63/12* (2013.01); *B01D 46/003* (2013.01); *B01D 46/0004* (2013.01); *B01D 46/0019* (2013.01); *B01D 46/24* (2013.01); *B01D 50/00* (2013.01); *B01D 53/22* (2013.01); *B01D 53/229* (2013.01); *B01D 63/10* (2013.01); *C10L 3/101* (2013.01); *B01D 65/025* (2013.01); *B01D 2256/245* (2013.01); *B01D 2257/108* (2013.01); *B01D 2257/304* (2013.01); *B01D 2257/504* (2013.01); *B01D 2257/7022* (2013.01); *B01D 2257/80* (2013.01); *B01D 2311/04* (2013.01); *B01D 2313/13* (2013.01); *B01D 2313/20* (2013.01); *B01D 2313/21* (2013.01); *B01D 2313/90* (2013.01); *B01D 2317/04* (2013.01); *B01D 2319/04* (2013.01); *Y02C 10/10* (2013.01)

(58) Field of Classification Search
CPC ............. B01D 46/003; B01D 46/0004; B01D 46/0019; B01D 46/24; B01D 50/00; B01D 53/22; B01D 53/229; B01D 63/10; B01D 63/12; B01D 65/025; B01D 2256/245; B01D 2257/108; B01D 2257/304; B01D 2257/504; B01D 2257/7022; B01D 2257/80; B01D 2311/04; B01D 2313/13; B01D 2313/20; B01D 2313/21; B01D 2313/90; B01D 2319/02; B01D 2319/04; B01D 2317/04; B01D 2319/02; B01D 2319/04; C10L 3/101; Y02C 10/10

See application file for complete search history.

(56) References Cited

U.S. PATENT DOCUMENTS

| | | | | |
|---|---|---|---|---|
| 3,809,615 | A | * | 5/1974 | Klass et al. ...................... 435/25 |
| 4,130,403 | A | * | 12/1978 | Cooley et al. ..................... 95/49 |

(Continued)

*Primary Examiner* — Jason M Greene
*Assistant Examiner* — Anthony Shumate
(74) *Attorney, Agent, or Firm* — Timothy A. Hott; Janet Farrant

(57) ABSTRACT

A membrane separation assembly that includes an integrated filter element and at least one membrane module housed within a first vessel and a second vessel containing at least one membrane module, which is stacked or aligned adjacent to the first vessel. The first vessel is configured to allow liquids to be trapped and removed from the assembly, and gases to flow to and through the membrane modules of the first vessel and the membrane modules of the second vessel, which are ultimately withdrawn from the assembly. The assembly is useful in the conditioning of fuel gas to separate methane from $C_{2+}$ hydrocarbons.

32 Claims, 7 Drawing Sheets

(51) Int. Cl.
*C10L 3/10* (2006.01)
*B01D 65/02* (2006.01)

(56) References Cited

U.S. PATENT DOCUMENTS

| | | | |
|---|---|---|---|
| 4,857,078 A | 8/1989 | Watler | |
| 4,963,165 A | 10/1990 | Blume et al. | |
| 5,089,033 A | 2/1992 | Wijmans | |
| 5,199,962 A | 4/1993 | Wijmans | |
| 5,205,843 A | 4/1993 | Kaschemekat et al. | |
| 5,374,300 A | 12/1994 | Kaschemekat et al. | |
| 5,407,466 A * | 4/1995 | Lokhandwala et al. | 95/49 |
| 5,501,722 A | 3/1996 | Toy et al. | |
| 5,800,597 A * | 9/1998 | Perrotta et al. | 96/9 |
| 6,053,965 A | 4/2000 | Lokhandwala | |
| 6,281,255 B1 | 8/2001 | Kunin et al. | |
| 6,776,820 B2 * | 8/2004 | Bikson et al. | 95/52 |
| 7,267,774 B2 * | 9/2007 | Peyton et al. | 210/603 |
| 8,540,804 B2 * | 9/2013 | Vaidya et al. | 95/214 |
| 8,679,314 B1 * | 3/2014 | Snyder et al. | 204/524 |
| 8,696,791 B2 * | 4/2014 | Vaidya et al. | 95/11 |
| 8,876,945 B2 * | 11/2014 | Taylor et al. | 95/46 |
| 8,906,143 B2 * | 12/2014 | Lokhandwala | 96/4 |
| 8,906,203 B2 * | 12/2014 | Ugolin | 203/10 |
| 2007/0125537 A1 * | 6/2007 | Lokhandwala et al. | 166/291 |
| 2010/0186586 A1 * | 7/2010 | Chinn et al. | 95/45 |
| 2011/0210080 A1 * | 9/2011 | Kumakiri et al. | 210/748.09 |
| 2012/0074053 A1 * | 3/2012 | Collignon et al. | 210/209 |
| 2012/0103185 A1 * | 5/2012 | Vaidya et al. | 95/11 |
| 2012/0125839 A1 * | 5/2012 | Watari et al. | 210/615 |
| 2012/0160750 A1 * | 6/2012 | Choi et al. | 210/151 |
| 2012/0291484 A1 * | 11/2012 | Terrien et al. | 62/619 |
| 2012/0292574 A1 * | 11/2012 | Terrien et al. | 252/373 |
| 2013/0032028 A1 * | 2/2013 | Miyazawa et al. | 95/22 |
| 2013/0055897 A1 * | 3/2013 | Lokhandwala | 96/4 |
| 2013/0206672 A1 * | 8/2013 | Harness et al. | 210/321.72 |
| 2013/0213892 A1 * | 8/2013 | Henthorne | 210/650 |
| 2013/0319937 A1 * | 12/2013 | Brinton et al. | 210/609 |
| 2013/0343978 A1 * | 12/2013 | Ballaguet et al. | 423/242.1 |

* cited by examiner

MEMBRANE SEPARATION ASSEMBLY FOR FUEL GAS CONDITIONING

CROSS-REFERENCE TO RELATED APPLICATIONS

This application is a continuation-in-part of U.S. application Ser. No. 13/224,891, filed Sep. 2, 2011, the disclosure of which is hereby incorporated herein by reference in its entirety.

FIELD OF THE INVENTION

The invention relates to a gas separation assembly comprising a first vessel containing gas separation membranes and an integrated filter element and at least a second vessel containing gas separation membranes, wherein the first vessel and second vessel are aligned or stacked adjacent to one another within the assembly. The assembly is useful in the conditioning of fuel gas to separate methane from $C_{2+}$ hydrocarbons.

BACKGROUND OF THE INVENTION

Natural gas is the most important fuel gas in the United States and provides more than one-fifth of all the primary energy used in the United States. Natural gas is also used extensively as a basic raw material in the petrochemical and other chemical process industries. The composition of natural gas varies widely from field to field. For example, a raw gas stream may contain as much as 95% methane, with only minor amounts of other hydrocarbons, nitrogen, carbon dioxide, hydrogen sulfide, or water vapor. On the other hand, streams that contain relatively large proportions of heavier hydrocarbons and/or other contaminants are common. Before the raw gas can be sent to the supply pipeline, it must usually be treated to remove at least one of these contaminants.

As it travels from the wellhead to the processing plant and, ultimately, to the supply pipeline, gas may pass through compressors or other field equipment. These units require power, and it is desirable to run them using gas engines fired by natural gas from the field. Since the gas has not yet been brought to specification, however, this practice may expose the engine to fuel that is of overly high Btu value, low methane number, or is corrosive.

In the gas processing plant itself, heavy hydrocarbons are often removed by condensation. Such a method is impractical in the field, however, because sources of external cooling or refrigeration are not available. Furthermore, cooling of the raw gas, which still contains substantial quantities of water vapor, is likely to bring the gas to a pressure/temperature/composition condition under which hydrates can begin to crystallize, thereby clogging the condensation equipment and preventing gas flow.

That membranes can separate $C_{3+}$ hydrocarbons from gas mixtures, such as natural gas, is known, for example, from U.S. Pat. Nos. 4,857,078; 5,281,255; 5,501,722; and 6,053,965. Separation of acid gases from other gases is taught, for example, in U.S. Pat. No. 4,963,165. It has also been recognized that condensation and membrane separation may be combined, as is shown in U.S. Pat. Nos. 5,089,033; 5,199,962; 5,205,843; and 5,374,300.

Conventional membrane skids for use in fuel gas conditioning include at least two separate components: a filter element and one or more membrane vessels. Besides the separate vessels for the filters and membrane elements, the skid carries piping, valves, and other components needed to connect the filter and membrane vessels, as well as pipework and instrumentation to enable the filter/membrane skid to be tied in to the compressor skid or other equipment at the site. The costs for the piping and skid can be substantial, and the interconnecting piping may need to be insulated, heat-traced, and comply with specifications and codes to be used in the field. In addition, the skid itself requires longer to fabricate if piping is involved.

The traditional skidded approach described above is appropriate for larger fuel gas conditioning units (FGCUs) having relatively large numbers of membrane elements housed in multiple vessels. For smaller fuel gas conditioning applications that require only one or a few elements that can be housed in one membrane vessel, the relative costs of the pipework and frame become disproportionately high, and the time and complexity of installation discourage potential users due to price. There remains a need for simpler, more cost-effective equipment, especially where the gas to be conditioned has a relatively small flow rate.

SUMMARY OF THE INVENTION

The invention is a fuel gas conditioning unit or assembly that comprises a first vessel housing a filter and one or more selective separation modules and at least one second vessel housing one or more membrane modules. The assembly may optionally be mounted directly on the compressor frame, without the need for its own supporting frame, thereby reducing complexity, costs, and set-up time.

The first vessel of the present invention typically has a number of nozzles and ports through which the gas to be conditioned can enter, the liquids collected by the filter can be drained, the treated gas can exit as separate residue and permeate streams, and untreated filtered gas can exit as a feed stream to be treated by the membrane separation elements of the second vessel. These nozzles may be connected directly to the gas and fuel lines as appropriate, greatly reducing the need for interconnecting pipework, valves, gauges, and the like, and the concomitant costs.

The second vessel of the present invention contains at least one membrane module for treating any untreated filtered gas from the first vessel. The second vessel also has feed, permeate and residue nozzles that are connected to corresponding nozzles on the first vessel. This connection allows the two vessels to be in fluid communication with one another.

Accordingly, disclosed herein is a gas separation assembly comprising:
(a) a first vessel housing at least the following components:
   (i) a filter element,
   (ii) a first membrane module containing a gas separation membrane selective between methane and other gases; the membrane module having a feed side and a permeate side,
   wherein the first vessel includes:
   (i) a feed inlet port in fluid communication with the filter element,
   (ii) at least one liquid outlet,
   (iii) means for allowing access to the filter element,
   (iv) means for allowing access to the first membrane module,
   (v) means for directing a filtered gas stream to the feed side,
   (vi) a first feed nozzle;
   (vii) a first permeate nozzle, and
   (viii) a first residue nozzle,
(b) a second vessel housing a second membrane module containing a gas separation membrane selective between methane and other gases; the membrane module having a feed side and a permeate side,
wherein the second vessel includes:
(i) a second feed nozzle in fluid communication with the first feed nozzle of the first vessel,
(ii) a second residue nozzle in fluid communication with the first residue nozzle of the first vessel,
(iii) a second permeate nozzle in fluid communication with the first permeate nozzle of the first vessel, and
(iv) means for allowing access to the second membrane module;
(c) a residue outlet port through which treated residue gas may exit the assembly; and
(d) a permeate outlet port through which treated permeate gas may exit the assembly.

The membrane modules typically contain polymeric membranes, of the type known in the art (which will be discussed in further detail in the Detailed Description), but may alternatively comprise non-polymeric, ceramic, or other type of selective barrier materials exhibiting selectivity for one or more components found in natural gas over other components.

The means for allowing access to the filter element and the membrane modules are typically removable heads or flanges.

In particular embodiments, such as when spiral-wound elements or modules are used, the vessels further comprise a permeate pipe in fluid communication with the permeate side of the selective separation element.

The vessels may be adapted to house one or multiple membrane modules.

In certain embodiments, the assembly is adapted to be operable in a substantially vertical orientation, such that the vessels have a top end and a bottom end. In one particular embodiment, the filter element is below the membrane modules, and the liquid outlet is proximate to the bottom end of the first vessel.

In another vertically configured embodiment, the filter element is above the membrane modules, and the liquid outlet is proximate to the top end of the first vessel. In this particular configuration, the first vessel is typically adapted to remove liquids in two stages from a gaseous feed stream (which will be described in further detail in the Detailed Description). In this configuration, a section of the first vessel housing the filter element is typically divided into two compartments that are separated from each other by a liquid-impermeable plate.

In other embodiments, the assembly is adapted to be operable in a substantially horizontal orientation. In one such embodiment, the first vessel of the assembly may be adapted to remove liquids in two stages from a gaseous feed stream. In this configuration, a section of the first vessel housing the filter element is typically divided into two compartments that are separated from each other by a liquid-impermeable plate.

In yet another embodiment, the first vessel of the assembly is adapted to be operable in an L-shaped configuration. This configuration is particularly beneficial in situations in which there are three or more membrane modules and, in particular, where height limitations are involved. In certain embodiments, the filter element is the vertical portion of the apparatus, and the membrane modules are the horizontal portion; in other embodiments, the membrane modules are the vertical portion of the assembly, and the filter element is the horizontal portion.

In other embodiments, the first vessel also comprises a first membrane/feed chamber connected to the first feed nozzle, a first residue chamber connected to the first residue nozzle, and a first permeate chamber connected to the first permeate nozzle. In some embodiments, the second vessel also comprises a second feed chamber connected to the second feed nozzle, a second residue chamber connected to the second residue nozzle, and a second permeate chamber connected to the second permeate nozzle. The residue chamber and the permeate chamber are typically adjacent to each other and separated by a gas-tight plate that is removable from the vessel in order to remove the membrane modules if so desired.

In certain embodiments, the residue outlet port is connected to the first residue chamber and the permeate outlet port is connected to the first permeate chamber of the first vessel. In other embodiments, the residue outlet port and permeate outlet ports are connected to the residue chamber and the permeate chamber, respectively, of another vessel within the assembly. In an alternative embodiment, the residue outlet port and permeate outlet port are positioned on two different vessels within the assembly.

In some embodiments, the second vessel is an intermediate vessel within a stack or array of a plurality of other like vessels. In order to be in fluid communication with adjacent vessels, the second vessel further comprises a third feed nozzle, a third permeate nozzle, and a third residue nozzle. The assembly of this particular embodiment also includes a third vessel housing a third membrane module containing a gas separation membrane selective between methane and other gases;
wherein the third vessel includes:
(i) a fourth feed nozzle in fluid communication with the third feed nozzle of the second vessel,
(ii) a fourth residue nozzle in fluid communication with the third residue nozzle of the second vessel,
(iii) a fourth permeate nozzle in fluid communication with the third permeate nozzle of the second vessel, and
(iv) means for allowing access to the third membrane module;

In an alternative embodiment, the first vessel is an intermediate vessel within the assembly, such as between a second and third vessel, and further comprises a second feed nozzle, a second residue nozzle, and a second permeate nozzle. In this embodiment, the second vessel within the assembly includes the components as described above. The third vessel in this particular embodiment includes:
(i) a fourth feed nozzle in fluid communication with the second feed nozzle of the first vessel,
(ii) a fourth residue nozzle in fluid communication with the second residue nozzle of the first vessel,
(iii) a fourth permeate nozzle in fluid communication with the second permeate nozzle of the first vessel, and
(iv) means for allowing access to the third membrane module;

In some embodiments, the third vessel is another intermediate vessel within the assembly and comprises a fifth feed nozzle, a fifth residue nozzle, and a fifth permeate nozzle. These nozzles are connected to corresponding nozzles in another vessel within the assembly.

The separation assembly of the present invention is particularly useful in fuel gas conditioning applications, for separating methane from $C_{2+}$ hydrocarbons. In the case of hydrocarbon separations, the membrane module(s) is typically a membrane element(s) that contains membranes that preferentially permeate $C_{2+}$ hydrocarbons over methane, or that preferentially permeate methane over $C_{2+}$ hydrocarbons.

Membranes that are preferentially permeable to methane over $C_{2+}$ hydrocarbon will typically include a selective layer that comprises a glassy polymeric material. Membranes that are preferentially permeable to $C_{2+}$ hydrocarbons over methane will typically include a selective layer that comprises a rubbery elastomeric polymer. Preferred membrane materials are discussed in the Detailed Description.

In addition to hydrocarbon separations, the assembly of the invention is also useful in any application which involves a single membrane/filter vessel and an additional separation vessel, including, without limitation, carbon dioxide, hydrogen, and hydrogen sulfide separations, as well as dehydration applications.

It is to be understood that the above summary and the following detailed description are intended to explain and illustrate the invention without restricting its scope.

DETAILED DESCRIPTION OF THE INVENTION

The invention is a fuel gas conditioning unit that comprises a first vessel containing at least one filter element and at least one membrane module within a single housing and a second vessel containing at least one membrane module that is in fluid communication with the first vessel. The assembly of the invention can be used in conjunction with most fuel gas conditioning processes known in the art.

A preferred fuel gas conditioning process is disclosed in U.S. Pat. No. 6,053,965 ("the '965 patent"). The process disclosed in the '965 patent utilizes rubbery polymeric membranes to separate $C_{3+}$ hydrocarbons from methane. A $C_{3+}$-enriched permeate stream is withdrawn. The methane-enriched membrane residue stream may optionally be used as combustion fuel.

A particularly preferred fuel gas conditioning process is disclosed in U.S. patent application Ser. No. 13/182,106 ("the '106 application"), which teaches the use of glassy polymeric membranes to separate methane and $C_{2+}$ hydrocarbons. The permeate stream, which is enriched in methane and depleted in $C_{2+}$ hydrocarbons, is routed as part of a fuel gas stream to a fuel user, which is typically a gas engine or other device used to generate power or drive a compressor, but may alternatively be a generator set or boiler, for example and not by way of limitation. The $C_{2+}$-enriched membrane residue stream is routed back to the process as part of the feed gas stream. The process disclosed in the '106 application essentially reverses the approach taken in the '965 patent by using glassy polymeric membranes that are preferentially permeable to methane over $C_{2+}$ hydrocarbons.

The disclosures of the '965 patent and the '106 application are hereby incorporated by reference in their entireties.

In its most basic form, the invention is a membrane separation assembly in which the filter element and membrane module(s) are housed within a common vessel, and where internal components of the vessel are configured in such a manner as to allow liquids to be trapped and removed from the vessel, and gases to flow to and through the membrane modules of the vessel and other vessel in the assembly. Various preferred embodiments of the invention are shown in FIGS. 1-6, described below. Each of these figures shows a representative two membrane modules mounted within the first and second vessels. It will be apparent to those of skill in the art that more or fewer membrane modules may be included in the series to provide more or less gas processing, as required.

Figure 1A:
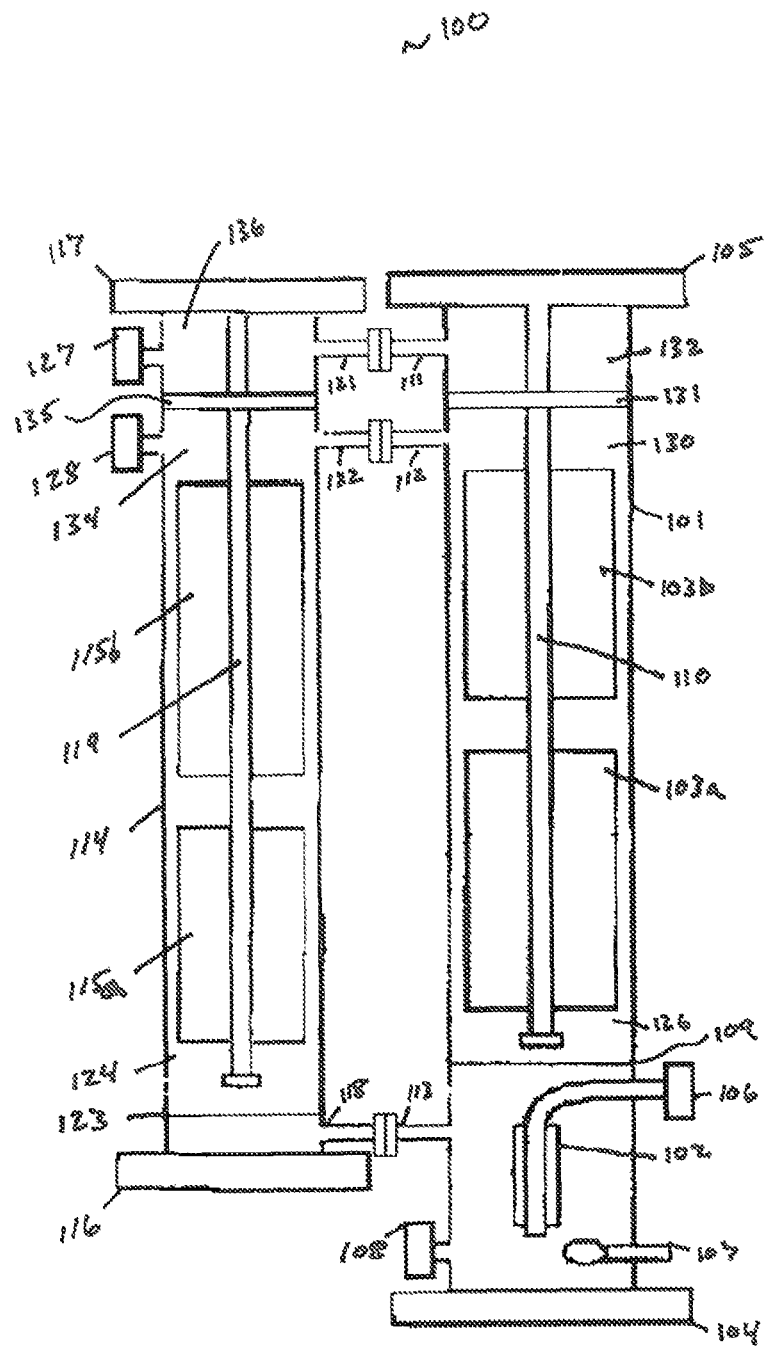
FIG. 1A is a cross-sectional view of a vertically oriented, single-stage filter/membrane separation assembly in accordance with the invention.

FIG. 1A is a cross-sectional view of a basic embodiment of an assembly, 100, in accordance with the invention. This basic embodiment illustrated in FIG. 1A is configured to be operable vertically, with the filter below the membrane module(s) in the first vessel. In this way, feed gas that is directed into the vessel may simply rise from the filter to reach the membrane module(s). The second vessel is connected to the left of the first vessel by the feed, residue, and permeate nozzles of each vessel. In other embodiments, the second vessel may be connected to the right of the first vessel depending on the requirements of the user.

Referring to FIG. 1A, assembly, 100, includes at least one filter element, 102, and at least one membrane module, 103a, contained within a first housing or vessel, 101. The first vessel, 101, typically takes the form of a cylindrical shell equipped with two removable heads—104 and 105—one at each end of the vessel. In the drawing, the heads are shown to be flanged, and are typically connected to the shell by means of bolts (not shown), although any appropriate means of attachment that allows the heads to be easily removable from the vessel is intended to be within the scope of the invention. Although heads 104 and 105 are shown in FIG. 1 as being flat plates, other types of configurations, such as curved or arched heads, are within the scope of the invention.

Removable bottom head, 104, allows the filter element, 102, to be removed and replaced or cleaned; correspondingly, removable top head, 105, allows the membrane module, 103a, to be removed and replaced or cleaned.

The vessels or housings described herein may be made of any convenient material. Housings are typically made of metal, conforming to appropriate codes for the operating conditions to which they are to be exposed. In the case that the feed gas is introduced at ambient pressure and 40° C., for example, a housing made from a plastic may suffice, so long as the material has adequate thermal conductivity. In the case that the feed is under high pressure or is very hot, a stainless or carbon steel housing, for example, may be needed. In general, metal housings are preferred.

First vessel or housing, 101, contains at least one filter element, 102. In the representative embodiment shown in FIG. 1A, the filter, 102, is a simple coalescing filter, but any filter or set of filters adapted to capture entrained liquids from gases may be used. Filter elements for use in the membrane separation apparatus of the invention are widely known in the art and can be obtained from a variety of different manufacturers, including Peco (Mineral Wells, Tex.); Pall (Port Washington, N.Y.); Dollinger (Ocala, Fla.); and Jonell (Breckinridge, Tex.).

In the representative embodiment shown in the figures, the first housing contains two membrane modules arranged serially, so that residue gas from the first module may proceed to and enter as feed gas into the second module. The membrane modules are usually sealed in gas-tight relationship against the inner walls of the housing, as is familiar to those of skill in the art, such that feed gas may not bypass the modules.

Membranes for use in the process of the invention will preferably comprise polymers that will preferentially permeate $C_{2+}$ hydrocarbons over methane (as described in the '965 patent), or that will preferentially permeate methane over $C_{2+}$ hydrocarbons (as described in the '106 application).

As described in the '965 patent, membranes that preferentially permeate $C_{3+}$ hydrocarbons over methane are preferably made from an elastomeric or rubbery polymer, examples of which include, but are not limited to, nitrile rubber, neoprene, polydimethylsiloxane (silicone rubber), chlorosulfonated polyethylene, polysilicone-carbonate copolymers, fluoroelastomers, etc. (further examples are provided within the disclosure of the '965 patent). Silicone rubber is the most preferred material for separating $C_{3+}$ hydrocarbons from methane.

As described in the '106 application, membranes that preferentially permeate methane over $C_{2+}$ hydrocarbons are preferably made from a glassy polymer, examples of which include, but are not limited to, polyamides, polyimides, polysulfones, polyvinyl alcohol, polypropylene oxide, cellulose derivatives, polyvinylidene fluoride, and polymers having repeating units of fluorinated dioxoles, fluorinated dioxolanes, and fluorinated cyclically polymerizable alkyl ethers. Particularly preferred membranes have selective layers made from a hydrophobic fluorinated glassy polymer or copolymer The membranes are typically composite membranes manufactured as flat sheets and housed in spiral-wound module, although any membrane modules capable of being housed in the vessel and performing the appropriate separation may be used. Such membranes and elements/modules are well-known in the art and described copiously in the literature.

In addition to the filter element and membrane module(s), the first vessel, 101, typically includes the following basic components: feed inlet port, 106; float switch, 107; liquid outlet, 108 (typically a valve); first mesh pad, 109; first feed/membrane chamber, 126; first permeate pipe, 110; first permeate nozzle, 111; first residue nozzle, 112; first feed nozzle, 113; first gas-tight plate, 131; first residue chamber, 130; and first permeate chamber, 132. All of the various valves, nozzles, and other components used in the apparatus are of the type known in the art of membrane module manufacture.

The second vessel, 114, contains additional membrane modules, 115a and 115b, for carrying out parallel gas separation in conjunction with membrane modules, 103a and 103b, of the first vessel. The second vessel also includes removable heads, 116 and 117; second feed nozzle, 118; second feed/membrane chamber, 124; second permeate pipe, 119; second permeate nozzle, 121; second residue nozzle, 122; second mesh pad, 123; second gas-tight plate, 135; second residue chamber, 134; second permeate chamber, 136; permeate outlet port, 127; and residue outlet port, 128.

In operation, a gaseous feed stream flows into first vessel, 101, through inlet/feed port, 106. From inlet/feed port, 106, the gaseous feed stream flows into filter chamber, 120, and through filter element, 102. Aerosolized droplets within the gas stream coalesce and fall from the filter to the bottom of the housing, where they form a body of collected liquid. When liquid builds up to a certain level at the bottom of the housing, an optional float switch, 107, triggers opening of a liquid outlet, 108, which is typically a valve (often referred to as a "dump valve") that opens to release the entrapped liquid. Alternatively, opening of the liquid outlet, 108, can be triggered either manually, or by other appropriate automatic/automated means.

A portion of the remaining gas then passes through an optional mesh pad, 109, as a feed stream to membrane modules, 103a and 103b. First mesh pad, 109, provides some additional filtration, in that it will trap vapors that are carried upward by the gas stream.

The membrane feed stream, which is typically at high pressure, flows into membrane chamber, 126, and across the feed surface of the membranes in the membrane vessels, 103a and 103b. The permeate side of the membranes is typically maintained at lower pressure to provide a driving force for transmembrane permeation. Permeating gas from membrane modules, 103a and 103b, passes through the membranes to first permeate pipe, 110, where it is collected in first permeate chamber, 132, and exits the first vessel through permeate nozzle, 111. Residue gas from membrane modules, 103a and 103b, collects in first residue chamber, 130, and exits the first vessel through residue nozzle, 112.

A first removable gas-tight plate, 131, separates first permeate chamber, 132, and adjoining residue chamber, 130. In this embodiment and other embodiments described herein, the plate is designed to be thick enough to withstand the pressure difference between the two chambers. Surrounding at least one side of the gas-tight plate is a seal to secure the plate against the interior wall of the tube to prevent gas leakage between the chambers on either side of the plate, especially during use when the residue side is under high pressure. The seal is normally expandable and made of an elastomeric material. Any type of seal known in the art that is suitable for gas separation equipment may be used. Based on the seal configuration, various types of commercially available seals are available, such as O-rings, V-seals, and U-cups. In a preferred embodiment, the seal is a U-cup, which is designed to seal more firmly against the surfaces it addresses as the pressure drop across the seal increases.

An advantage of using seals, rather than welding gas-tight plates to the vessel interior, is that they can be removed, allowing access to the gas separation membrane modules within the vessel for installing, cleaning, repairing, or removing the membrane elements or modules.

A second portion of the feed gas from the first vessel enters the second vessel via second feed nozzle, 118, into second feed/membrane chamber, 124. In the embodiment shown in FIG. 1, second mesh pad, 123, in the second vessel, 114, provides additional filtration for the feed gas. The use of a second mesh pad in the second vessel will depend on the location of the connection between second feed nozzle, 118, and first feed nozzle, 113. If the connection of these two feed nozzles is located before the position of first mesh pad, 109, then a second mesh pad will be needed to provide extra filtration of the feed gas entering the second vessel. If the connection is located after the position of the first mesh pad, 109, then a second mesh pad may not be needed since the feed gas was already filtered by first mesh pad, 109.

The feed stream is typically at high pressure and is able to flow into membrane chamber, 124, and across the feed surface of the membranes in the membrane modules, 115a and 115b. The permeate side of the membranes is typically maintained at lower pressure to provide a driving force for transmembrane permeation. Permeating gas from membrane modules, 115a and 115b, passes through the membranes to second permeate pipe, 119, and is collected in second permeate chamber, 136.

Permeate gas from membrane modules, 115a and 115b, is combined in the second permeate chamber, 136, with permeate gas from the first vessel, 101, which enters second vessel, 114, through second permeate nozzle 121. The combined permeate gas ultimately exits the assembly through permeate outlet port, 127. Residue gas from membrane modules, 115a and 115b, combines with residue gas from the first vessel, 101, in second residue chamber, 134. Residue gas from the first vessel, 101, enters the second vessel via second residue nozzle, 122. The combined residue gas ultimately exits the assembly through residue outlet port, 128.

In FIG. 1A, permeate and residue outlet ports, 127 and 128, respectively, are depicted as being located on the second vessel, 114. It is to be understood that a person skilled in the art would appreciate that the permeate and residue outlet port may be positioned on any vessel depending on the requirements of the user.

Figure 1B:
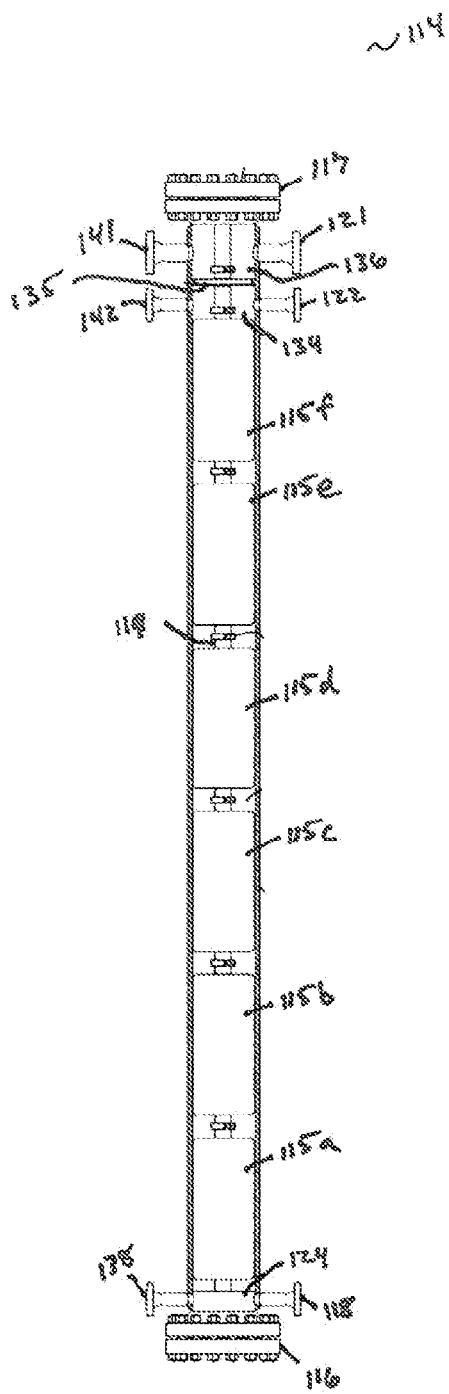
FIG. 1B is a vertical view of a membrane separation vessel having two feed nozzles, two permeate nozzle, and two residue nozzles.

FIG. 1B is an alternative embodiment of the second vessel, 114. In this embodiment, the second vessel, 114, is positioned as an intermediate vessel within a stack of multiple vessels similar to that of the second vessel. In order for the feed, permeate, and residue gases to flow from vessel to vessel, the second vessel, 114, comprises a third feed nozzle, 138, a third permeate nozzle, 141, and a third residue nozzle, 142. The third feed, residue and permeate nozzles are connected to corresponding nozzles on the next sequential vessel in the stack. For illustrative purposes, second vessel, 114, is shown in this case to contain more than two membrane separation elements or modules, 115a-f. The number of membrane elements or modules may be determined based on the amount of processing needed to be performed by the assembly. Usually, but not necessarily, each vessel will contain the same number of membrane modules.

Alternative embodiments of the assembly of the invention are shown in FIGS. 2-6. The preferences and choices for the individual assembly components for all figures are the same as described above for the embodiment shown in FIG. 1A, unless otherwise noted.

Figure 2:
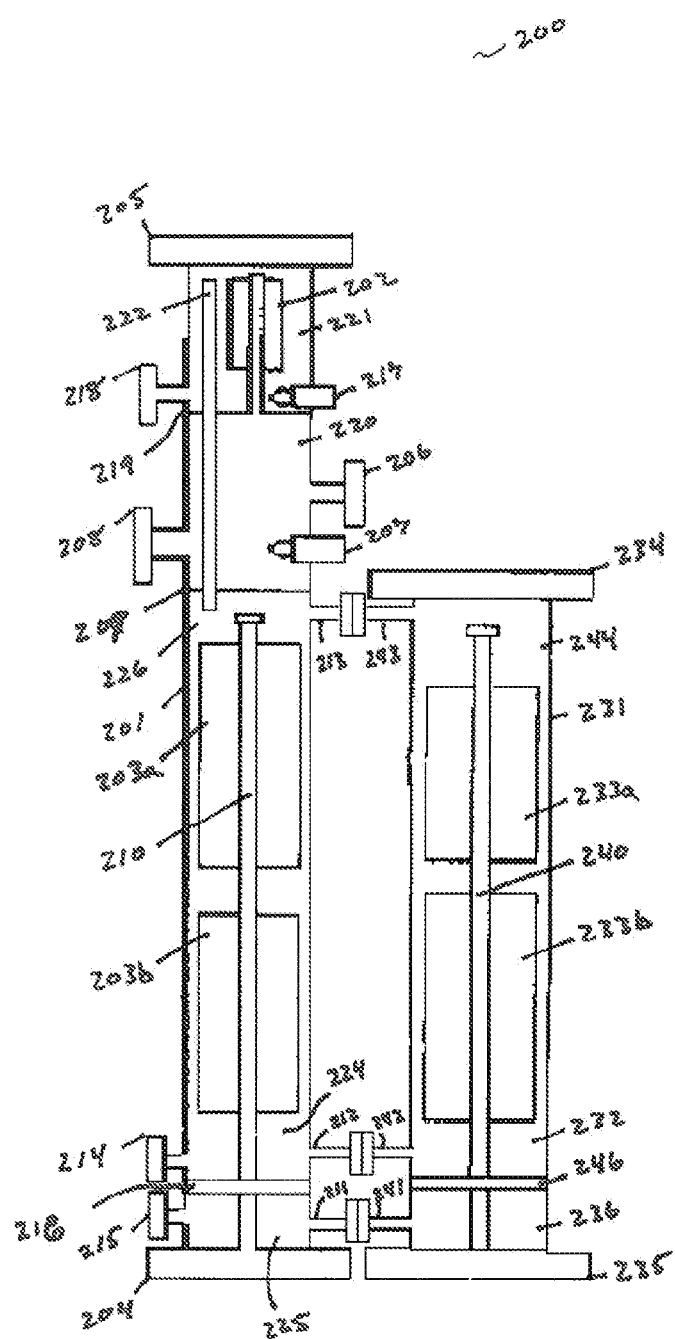
FIG. 2 is a cross-sectional view of a vertically oriented, two-stage filter/membrane separation assembly in accordance with the invention.

FIG. 2 is a cross-sectional view of a two-stage filter/membrane separation assembly, 200, in accordance with the invention. The embodiment of the assembly illustrated in FIG. 2 is configured to be operable vertically, in this case, with the filter above the membrane module(s) in the first vessel.

Like assembly 100, shown in FIG. 1A, first vessel, 201, includes at least one filter element, 202, and at least one membrane module, 203a. The housing, 201, typically takes the form of a cylindrical shell equipped with two removable heads—204 and 205—one at each end of the vessel. Removable top head, 204, allows the filter element, 202, to be removed and replaced or cleaned; correspondingly, removable bottom head, 205, allows the membrane module(s), 203a and 203b, to be removed and replaced or cleaned.

This first vessel, 201, includes two stages for liquids removal—a lower stage, 220, and an upper stage, 221—and is particularly suited to treating gas streams that are heavily contaminated with liquids or readily condensable vapors. In this vessel, the filter stages are positioned above the membrane separation modules, 203a and 203b, from which they are separated by a solid plate or wall, 209.

In addition to the elements described above, the first vessel, 201, typically includes the following basic components: feed inlet port, 206; first float switch, 207; first liquid outlet, 208; liquid-impermeable plates, 209 and 219; first feed/membrane chamber, 226; first permeate pipe, 210; first permeate nozzle, 211; first residue nozzle, 212; first feed nozzle, 213, second float switch, 217; second liquid outlet, 218; internal tube, 222; first gas-tight plate, 216; first residue chamber, 224; and first permeate chamber, 225.

The second vessel, 231, contains additional membrane modules, 233a and 233b, for carrying out parallel gas separation in conjunction with membrane modules, 203a and 203b, of the first vessel, 201. The second vessel also includes removable heads, 234 and 235; second feed nozzle, 243; second feed/membrane chamber, 244; second permeate pipe, 240; second permeate nozzle, 241; second residue nozzle, 242; second gas-tight plate, 246; second residue chamber, 232; and second permeate chamber, 236.

In operation, a gaseous feed stream flows into lower stage, 220, of first vessel, 201, through inlet port, 206. The lower stage, 220, collects bulk liquids from gas entering the vessel, 201, by allowing the liquids to collect and run down the interior walls of the vessel and collect on plate, 209. When liquid builds up to a certain level on plate, 209, an optional first float switch, 207, triggers opening of first liquid outlet, 208 (which is typically a valve as described above), that opens to release the entrapped liquid. Alternatively, opening of first liquid outlet, 208, can be triggered either manually, or by other appropriate automatic/automated means.

Remaining gas—including aerosolized droplets or mist—flows up through the filter element, 202, installed on plate, 219, into the upper stage, 221. Any additional aerosol present in the gas flowing through the filter, 202, coalesces and collects as liquid in stage, 221. When liquid builds up to a certain level in upper stage, 221, an optional second float switch, 217, triggers opening of second liquid outlet, 218, which is also typically a valve that opens to release the entrapped liquid. Alternatively, opening of second liquid outlet, 218, can be triggered either manually, or by other appropriate automatic/automated means.

The remaining gas—now essentially devoid of liquids and substantially devoid of aerosols—passes into the internal tube, 222, whence it flows downward as a feed stream to membrane chamber, 226. A portion of the feed stream, which is typically at high pressure, flows across the feed surface of the membranes in the membrane vessels, 203a and 203b. The permeate side of the membrane(s) is typically maintained at lower pressure to provide a driving force for transmembrane permeation. Permeating gas from membrane modules, 203a and 203b, passes through the membranes to permeate pipe, 210, whence it exits the assembly through permeate outlet port, 211. Residue gas from the membrane modules, 203a and 203b, exits the assembly through residue outlet port, 212.

A second portion of the feed gas from the first vessel enters the second vessel via second feed nozzle, 243, and into second membrane chamber, 244. The feed stream is typically at high pressure and is able to flow into second membrane chamber, 244, and across the feed surface of the membranes in the membrane modules, 233a and 233b. The permeate side of the membranes is typically maintained at lower pressure to provide a driving force for transmembrane permeation. Permeating gas from membrane modules, 233a and 233b, passes through the membranes to second permeate pipe, 240, is collected in second permeate chamber, 236, and exits the vessel through second permeate nozzle, 241. Residue gas from membrane modules, 233a and 233b, is collected in second residue chamber, 235, and exits the vessel through second residue nozzle, 242.

Second permeate nozzle, 241, is connected to first permeate nozzle, 211, thus allowing the permeate gas exiting the second vessel to flow into the first permeate chamber, 225, of the first vessel, and to ultimately exit the assembly through permeate outlet port, 215. Similarly, second residue nozzle, 242, is connected to the first residue nozzle, 212, thus allowing the residue gas exiting the second vessel to flow into the first residue chamber, 224, of the first vessel, and to ultimately exit the assembly through residue outlet port, 214.

Figure 3:
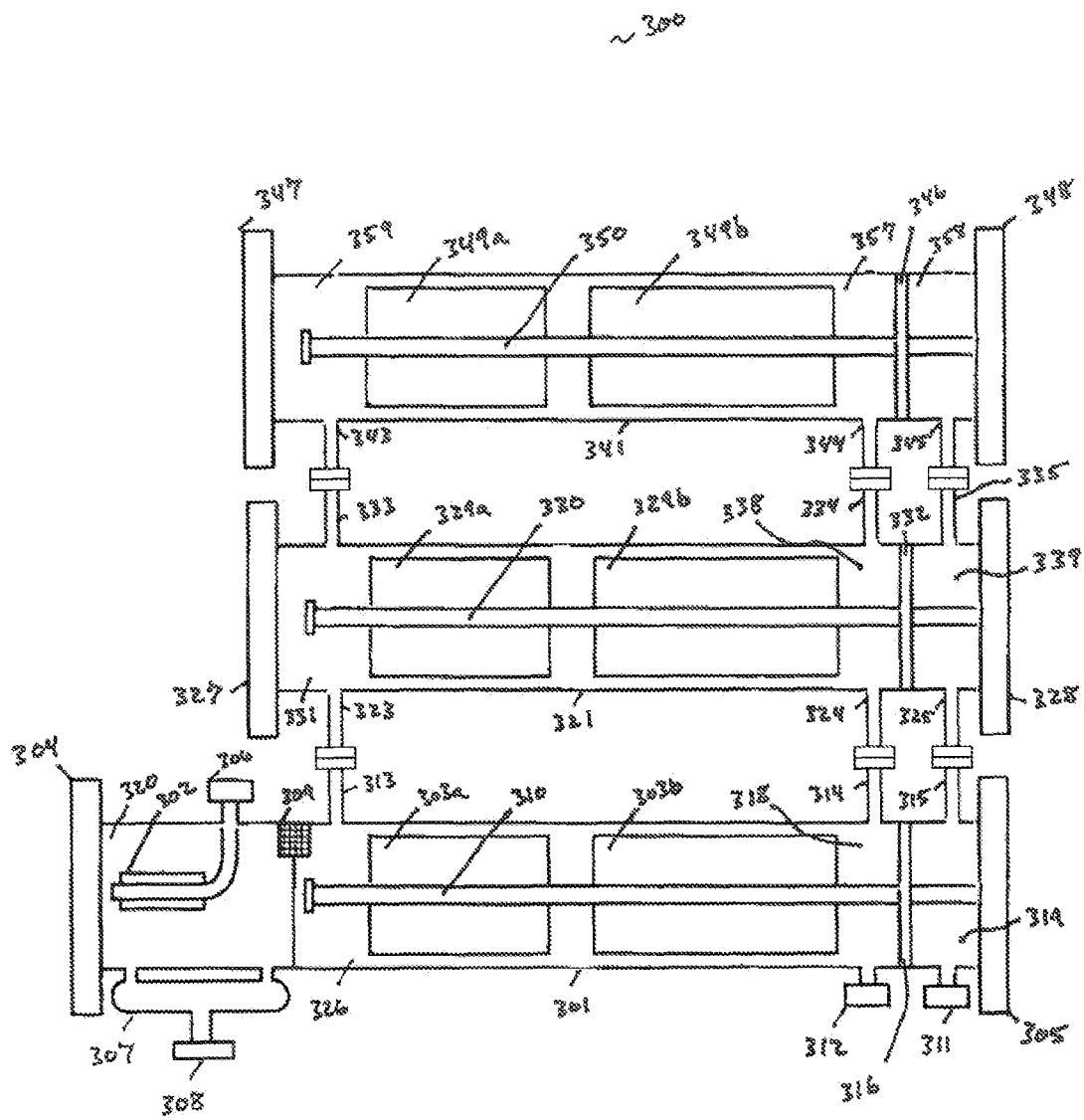
FIG. 3 is a cross-sectional view of a horizontally oriented, single-stage filter/membrane separation assembly in accordance with the invention.

FIG. 3 is a cross-sectional view of an alternative embodiment of an assembly, 300, containing a single-stage filter/membrane separation vessel, 301,—similar to the first vessel, 101, shown in FIG. 1A—except that assembly, 300, is configured to be operated horizontally, rather than vertically and is connected to two additional separation vessels, second vessel, 321, and third vessel, 341. When there is a space limitation on the assembly, a horizontal configuration may be preferred.

First vessel, 301, includes at least one filter element, 302, and at least one membrane module, 303*a*. The first vessel, 301, typically takes the form of a cylindrical shell equipped with two removable heads—304 and 305—one at each end of the vessel. Removable first head, 304, allows the filter element, 302, to be removed and replaced or cleaned; correspondingly, removable second head, 305, allows the membrane module(s), 303*a*, to be removed and replaced or cleaned.

In addition to the filter element and membrane module(s), the first vessel, 301, typically includes the following basic components: feed inlet port, 306; optional liquid reservoir, 307; liquid outlet, 308 (typically a valve); mesh pad, 309; first feed/membrane chamber, 326; first permeate pipe, 310; permeate outlet port, 311; residue outlet port, 312; first feed nozzle, 313; first residue nozzle, 314; first permeate nozzle, 315; first gas-tight plate, 316; first residue chamber, 318; and first permeate chamber, 319. In certain embodiments, permeate outlet port, 311, and residue outlet port, 312, may be located on another vessel, such as second vessel, 321, or third vessel, 341 within assembly, 300, or each port may be located on two different vessels.

The second vessel, 321, contains additional membrane modules, 329*a* and 329*b*, for carrying out parallel gas separation in conjunction with the membrane module of first vessel, 301. The second vessel also includes second removable heads, 327 and 328; second feed nozzle, 323; second feed/membrane chamber, 331; second permeate pipe, 330; second permeate nozzle, 325; second residue nozzle, 324; second gas-tight plate, 326; second residue chamber, 338; and second permeate chamber, 339. To allow the feed gas, permeate gas, and residue gas to flow vessel-to-vessel, second feed nozzle, 323, second permeate nozzle, 325, and second residue nozzle, 324, are each connected to respective feed, permeate, and residue nozzles on the first vessel.

In this particular embodiment, second vessel, 321, is an intermediate vessel, similar to the vessel shown in FIG. 1B, located between first vessel, 301, and third vessel, 341. In embodiments where there are more than two vessels, the intermediate vessel(s) will always have at least two sets of feed, permeate, and residue nozzles. In FIG. 3, second vessel, 321, contains third feed nozzle, 333; third residue nozzle, 334; and third permeate nozzle, 335.

Third vessel, 341, is the uppermost tube in the assembly and contains membrane modules, 349*a* and 349*b*, for carrying out parallel gas separation in conjunction with the membrane modules of first vessel, 301, and second vessel, 321. The third vessel also includes third removable heads, 347 and 348; fourth feed nozzle, 343; third permeate pipe, 350; fourth permeate nozzle, 345; fourth residue nozzle, 344; third gas-tight plate, 346; third residue chamber, 357; third permeate chamber, 358; and third feed/membrane chamber, 359.

In operation, a gaseous feed stream flows into vessel, 301, through feed inlet port, 306. From inlet port, 306, the gaseous feed stream flows into filter chamber, 320, and through filter element, 302. Aerosolized droplets within the gas stream coalesce and fall from the filter into an optional liquid reservoir, 307, where they form a body of collected liquid. When liquid builds up to a certain level in reservoir, 307, an optional float switch (not shown) triggers opening of a liquid outlet, 308, which is typically a valve that opens to release the entrapped liquid from optional liquid reservoir, 307, or directly from chamber, 320. Alternatively, opening of the liquid outlet, 308, can be triggered either manually, or by other appropriate automatic/automated means.

Remaining gas then passes through an optional mesh pad, 309, into first feed/membrane chamber, 326. A portion of the remaining gas is directed as a feed stream to membrane chamber, 326, which includes membrane modules, 303*a* and 303*b*. Mesh pad, 309, provides some additional filtration, in that it will trap vapors that are carried upward by the gas stream.

A portion of the membrane feed stream, which is typically at high pressure, flows across the feed surface of the membranes in the membrane modules, 303*a* and 303*b*. The permeate side of the membranes is typically maintained at lower pressure to provide a driving force for transmembrane permeation. Permeating gas from membrane modules, 303*a* and 303*b*, passes through the membranes to permeate pipe, 310, to first permeate chamber 319, whence it exits the assembly through permeate outlet port, 311. Residue gas from the membrane modules, 303*a* and 303*b*, enters first residue chamber, 318, and exits the assembly through residue outlet port, 312.

A second portion of the feed gas exits the first vessel through first feed nozzle, 313, enters the second vessel via connected second feed nozzle, 323, and is collected in second membrane chamber, 331. The feed stream is typically at high pressure and is able to flow into second membrane chamber, 331, and across the feed surface of the membranes in the membrane modules, 329*a* and 329*b*. The permeate side of the membranes is typically maintained at lower pressure to provide a driving force for transmembrane permeation. Permeating gas from membrane elements, 329*a* and 329*b*, passes through the membranes to second permeate pipe, 330, and is collected in second permeate chamber, 338.

Second permeate nozzle, 325, is connected to first permeate nozzle, 315, thus allowing the permeate gas exiting the second vessel to flow into the first permeate chamber, 319, of the first vessel, and to ultimately exit the assembly through permeate outlet port, 311. Similarly, second residue nozzle, 324, is connected to the first residue nozzle, 314, thus allowing the residue gas exiting the second vessel to flow into the first residue chamber, 318, of the first vessel, and to ultimately exit the assembly through residue outlet port, 312.

A third portion of the feed gas collected in membrane chamber, 331, of the second vessel exits the vessel through third feed nozzle, 333. The feed gas enters the third vessel, 341, via fourth feed nozzle, 343, and is collected in membrane feed chamber, 359. The feed stream is typically at high pressure and is able to flow into third membrane chamber, 359, and across the feed surface of the membranes in the membrane modules, 349*a* and 349*b*. The permeate side of the membranes is typically maintained at lower pressure to provide a driving force for transmembrane permeation. Permeating gas from membrane modules, 349*a* and 349*b*, passes through the membranes to third permeate pipe, 350, and is collected in third permeate chamber, 358. Residue gas from membrane modules, 349*a* and 349*b*, is collected in third residue chamber, 357.

Fourth permeate nozzle, 345, is connected to third permeate nozzle, 335, thus allowing the permeate gas exiting the third vessel to flow into the second permeate chamber, 338, of the second vessel, and to ultimately exit the assembly through permeate outlet port, 311, on the first vessel, 301. Similarly, fourth residue nozzle, 344, is connected to the third residue nozzle, 344, thus allowing the residue gas exiting the third vessel to flow into the second residue chamber, 337, of the second vessel, and to ultimately exit the assembly through residue outlet port, 312, on the first vessel, 301.

Figure 4:
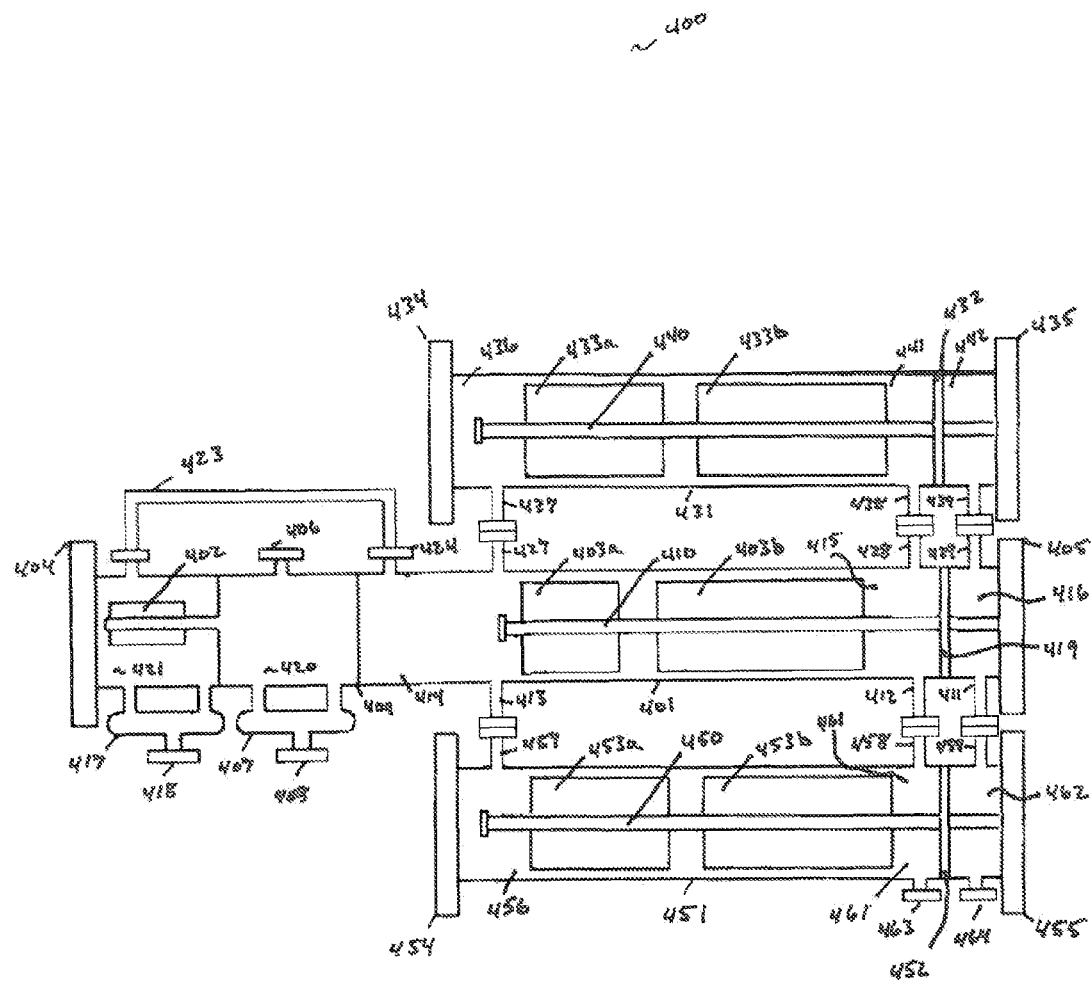
FIG. 4 is a cross-sectional view of a horizontally oriented, two-stage filter/membrane separation assembly in accordance with the invention.

FIG. 4 is a cross-sectional view of an alternative embodiment of an assembly, 400, comprising a two-stage filter/membrane separation vessel, 401,—similar to the first vessel shown in FIG. 2—except that first vessel, 401, is configured to be operated horizontally, rather than vertically and is connected to two additional separation vessels, second vessel, 431, and third vessel, 451.

First vessel, 401, includes at least one filter element, 402, and at least one membrane module, 403*a*. The housing, 401, typically takes the form of a cylindrical shell equipped with two removable heads—404 and 405—one at each end of the vessel. Removable first head, 404, allows the filter element, 402, to be removed and replaced or cleaned; correspondingly, removable second head, 405, allows the membrane module(s), 403, to be removed and replaced or cleaned.

This vessel, 401, provides two stages for liquids removal—a first stage, 420, and a second stage, 421—and is particularly suited to treating gas streams that are heavily contaminated with liquids or readily condensable vapors.

In addition to the elements described above, the first vessel, 401, typically includes the following basic components: feed inlet port, 406; optional first liquid reservoir, 407; first liquid outlet, 408; liquid-impermeable plate, 409; first feed/membrane chamber, 426: first permeate pipe, 410; first permeate nozzle, 411; first residue nozzle, 412; first feed nozzle, 413; optional second liquid reservoir, 417; second liquid outlet, 418; first gas-tight plate, 419; first residue chamber, 415; first permeate chamber, 416; second stage outlet, 422; external tube, 423; and membrane chamber inlet, 424.

In this particular embodiment, first vessel, 401, is an intermediate vessel located between upper second vessel and lower third vessel. In embodiments where there are more than two vessels, the intermediate vessel or vessel will always have at least two sets of feed, permeate, and residue nozzles. These additional nozzles on first vessel, 401, include second feed nozzle, 427; second residue nozzle, 428; and second permeate nozzle, 429.

The second vessel, 431, is the uppermost vessel in the assembly and contains additional membrane modules, 433*a* and 433*b*, for carrying out parallel gas separation in conjunction with the membrane modules of first vessel, 401. The second vessel also includes second removable heads, 434 and 435; second feed/membrane chamber, 436; third feed nozzle, 437; second permeate pipe, 440; third residue nozzle, 438; third permeate nozzle, 439; second gas-tight plate, 432; second residue chamber, 441; and second permeate chamber, 442. To allow the feed gas, permeate gas, and residue gas to flow from vessel to vessel, third feed nozzle, 437, third permeate nozzle, 439, and third residue nozzle, 438, are each connected to their respective nozzles on the first vessel.

Third vessel, 451, is the lowermost vessel in the assembly and contains membrane modules, 453*a* and 453*b*, for carrying out parallel gas separation in conjunction with the membrane modules of first vessel, 401, and second vessel, 431. The third vessel also includes third removable heads, 454 and 455; fourth feed nozzle, 457; third feed/membrane chamber, 456; third permeate pipe, 450; fourth permeate nozzle, 459; fourth residue nozzle, 458; third gas-tight plate, 452; third residue chamber, 461; third permeate chamber, 462; residue outlet port, 463; and permeate outlet port, 464.

In operation, a gaseous feed stream flows into first stage, 420, of first vessel, 401, through feed inlet port, 406. The first stage, 420, collects bulk liquids from gas entering the vessel, 401, by allowing the liquids to collect and run down the interior walls of the vessel and collect in optional first liquid reservoir, 407. When liquid builds up to a certain level in first liquid reservoir, 407, an optional first float switch (not shown) triggers opening of first liquid outlet, 408, which is typically a valve that opens to release the entrapped liquid from optional first liquid reservoir, 407, or directly from first chamber, 420. Alternatively, opening of first liquid outlet, 408, can be triggered either manually, or by other appropriate automatic/automated means.

Remaining gas—including aerosolized droplets or mist—flows into filter element, 402. Any additional aerosols present in the gas flowing through filter, 402, coalesces and collects as liquid in optional second liquid reservoir, 417. When liquid builds up to a certain level in second liquid reservoir, 417, an optional second float switch (not shown) triggers opening of second liquid outlet, 418, which is also typically a valve that opens to release the entrapped liquid from optional second liquid reservoir, 417, or directly from second chamber, 421. Alternatively, opening of second liquid outlet, 418, can be triggered either manually, or by other appropriate automatic/automated means.

The remaining gas—now essentially devoid of liquids and substantially devoid of aerosols—passes from the second stage, 421, through second stage outlet, 422, into external tube, 423, and from there through the membrane chamber inlet, 424, whence it flows as a feed stream to first membrane chamber, 426, which includes membrane modules, 403*a* and 403*b*. A portion of the membrane feed stream, which is typically at high pressure, flows across the feed surface of the membranes in the membrane vessels, 403*a* and 403*b*. The permeate side of the membrane(s) is typically maintained at lower pressure to provide a driving force for transmembrane permeation. Permeating gas from membrane modules, 403*a* and 403*b*, passes through the membranes to first permeate pipe, 410, whence it exits the vessel through first permeate nozzle, 411. Residue gas from the membrane modules, 403*a* and 403*b*, exits the vessel through first residue nozzle, 412.

Alternatively, instead of an external tube connecting second stage chamber, 421, to membrane shell, 401, the same can be accomplished by an internal pipe connecting second stage chamber, 421 with membrane vessel, 401, as taught above with respect to the vertically oriented, two-stage filter/membrane separation apparatus embodiment depicted in FIG. 2.

A second portion of the feed gas exits the first vessel through first feed nozzle, 427, enters the second vessel via third feed nozzle, 437, and is collected in second membrane chamber, 436. The feed stream is typically at high pressure and is able to flow into second membrane chamber, 436, and across the feed surface of the membranes in the membrane modules, 433*a* and 433*b*. The permeate side of the membranes is typically maintained at lower pressure to provide a driving force for transmembrane permeation. Permeating gas from membrane modules, 433*a* and 433*b*, passes through the membranes to second permeate pipe, 440, is collected in second permeate chamber, 442, and exits the vessel through third permeate nozzle, 439. Residue gas from membrane modules, 433*a* and 433*b*, is collected in second residue chamber, 441, and exits the vessel through third residue nozzle, 438.

Third permeate nozzle, 439, is connected to second permeate nozzle, 429, thus allowing the permeate gas exiting the second vessel to flow into the first permeate chamber, 416, of the first vessel, where it is combined with the permeate gas from first membrane modules, 403a and 403b. The combined permeate gas is then directed through first permeate nozzle, 411, to the third vessel, 451, where it exits the assembly through permeate outlet port, 464. Similarly, third residue nozzle, 438, is connected to the second residue nozzle, 428, thus allowing the residue gas exiting the second vessel to flow into the first residue chamber, 415, of the first vessel, where it is combined with the permeate gas from first membrane modules, 403 and 403b. The combined residue gas is then directed through first residue nozzle, 412, where it exits the assembly through residue outlet port, 463.

A third portion of the feed gas exits the first vessel through second feed nozzle, 413, and enters the third vessel via fourth feed nozzle, 457. The feed stream is typically at high pressure and is able to flow into third membrane chamber, 456, and across the feed surface of the membranes in the membrane modules, 453a and 453b. The permeate side of the membranes is typically maintained at lower pressure to provide a driving force for transmembrane permeation. Permeating gas from membrane modules, 453a and 453b, passes through the membranes to third permeate pipe, 450, and is collected in third permeate chamber, 461. The permeate gas from membrane modules, 453a and 453b, combines with the permeate gas from the first and second vessels and exits the assembly through permeate outlet port, 464. Similarly, residue gas from membrane modules, 453a and 453b, combines with the residue gas from the first and second vessels in third residue chamber, 462, and exits the assembly through residue outlet port, 463.

Figure 5:
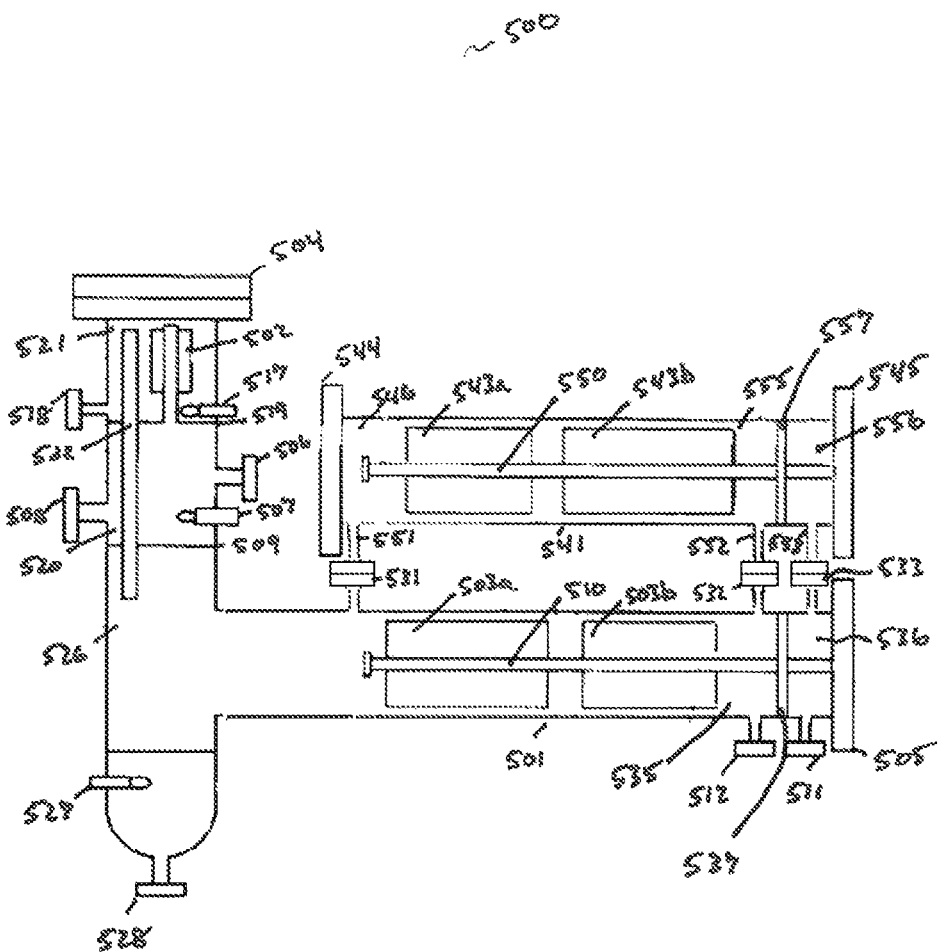
FIG. 5 is a cross-sectional view of an L-shaped, two-stage filter/membrane separation assembly in accordance with the invention.

In an alternative embodiment, the first vessel may take on an L-shaped configuration. FIG. 5 shows one such design. This configuration is particularly beneficial in situations where three or more membrane modules in the first vessel are involved (for simplicity, only two are shown in FIG. 5) and, in particular, where height limitations are involved.

FIG. 5 is a cross-sectional view of an assembly, 500, with an L-shaped, two-stage filter/membrane separation first vessel, 501, in accordance with the invention. The first vessel, 501, shown in FIG. 5 includes two stages for liquid removal, 520 and 521, with an optional third liquid removal stage, 523, and a membrane chamber, 526, which contains two membrane modules, 503a and 503b, all of which stages/chambers are contained within an L-shaped housing or vessel, 501.

The first vessel, 501, typically takes the form of a cylindrical shell equipped with two removable heads—504 and 505—one at each end of the vessel. Removable head, 504, allows the filter element, 502, to be removed and replaced or cleaned; correspondingly, removable head, 505, allows the membrane module(s), 503, to be removed and replaced or cleaned.

In addition to the elements described above, the first vessel, 501, typically includes the following basic components: feed inlet port, 506; first float switch, 507; first liquid outlet, 508; liquid-impermeable plates, 509 and 519; first permeate pipe, 510; permeate outlet port, 511; residue outlet port, 512; second float switch, 517; second liquid outlet, 518; internal tube, 522; first feed/membrane chamber, 526; optional third float switch, 527; optional third liquid outlet, 528; first feed nozzle, 531; first residue nozzle, 532; first permeate nozzle, 533; first residue chamber, 535; first permeate chamber, 536; and first removable gas-tight plate, 537. In certain embodiments, permeate outlet port, 511, and residue outlet port, 512, may be located on another vessel, such as second vessel, 541, within assembly, 500.

The second vessel, 541, contains additional membrane modules, 543a and 543b, for carrying out parallel gas separation in conjunction with the membrane modules of first vessel, 501. The second vessel also includes second removable heads, 544 and 545; second feed/membrane chamber, 546; second feed nozzle, 551; second permeate pipe, 550; second permeate nozzle, 553; second residue nozzle, 552; second removable gas-tight plate, 557; second residue chamber, 555; and second permeate chamber, 556. To allow the feed gas, permeate gas, and residue gas to flow from vessel to vessel, second feed nozzle, 551, second permeate nozzle, 553, and second residue nozzle, 552, are each connected to respective nozzles on the first vessel.

In this particular embodiment, second vessel, 541, is located above first vessel, 501. In other embodiments, the second vessel may be located below first vessel, 501, or may be an intermediate vessel in a series of staked or aligned membrane separation vessels.

In operation, a gaseous feed stream flows into first stage, 520, of first vessel, 501, through inlet/feed nozzle, 506. First stage, 520, collects bulk liquids from gas entering the first vessel, 501, by allowing the liquids to collect and run down the interior walls of the vessel and collect on plate, 509. When liquid builds up to a certain level on plate, 509, an optional first float switch, 507, triggers opening of first liquid outlet, 508 (which is typically a valve as described above), that opens to release the entrapped liquid. Alternatively, opening of first liquid outlet, 508, can be triggered either manually, or by other appropriate automatic/automated means.

Remaining gas—including aerosolized droplets or mist—flows up through filter element, 502, into second stage, 521. Any additional aerosols present in the gas flowing through filter, 502, coalesces and collects as liquid in second stage, 521. When liquid builds up to a certain level in second stage, 521, an optional second float switch, 517, triggers opening of second liquid outlet, 518, which is also typically a valve that opens to release the entrapped liquid. Alternatively, opening of second liquid outlet, 518, can be triggered either manually, or by other appropriate automatic/automated means.

The remaining gas then passes into internal tube, 522, connecting second stage, 521, to first membrane chamber, 526, whence a portion of it flows as a feed stream to membrane modules, 503a and 503b, in membrane chamber, 526. The membrane feed stream, which is typically at high pressure, flows across the feed surface of the membranes in the membrane vessels, 503a and 503b. The permeate side of the membrane(s) is typically maintained at lower pressure to provide a driving force for transmembrane permeation. Permeating gas from membrane modules, 503a and 503b, passes through the membranes to permeate pipe, 510, whence it exits the assembly through permeate outlet port, 511. Residue gas from the membrane modules, 503a and 503b, exits the assembly through residue outlet port, 512.

A second portion of the feed gas exits the first vessel, 501, through first feed nozzle, 531, and enters the second vessel, 541, via second feed nozzle, 551. The feed stream is typically at high pressure and is able to flow into second membrane chamber, 546, and across the feed surface of the membranes in the membrane modules, 543a and 543b. The permeate side of the membranes is typically maintained at lower pressure to provide a driving force for transmembrane permeation. Permeating gas from second membrane modules, 543a and 543b, passes through the membranes to second permeate pipe, 550, and is collected in second permeate chamber, 556. Residue gas from second membrane modules, 543a and 543b, is collected in second residue chamber, 555.

Permeate gas exits the second vessel, 541, through second permeate nozzle, 553, and is combined with the permeate gas from membrane modules, 503a and 503b, in first permeate chamber, 536, of the first vessel. The combined permeate gas then ultimately exits the assembly through permeate outlet port, 511. Similarly, residue gas exits the second vessel, 541, through second residue nozzle, 552, and is combined with the residue gas from membrane modules, 503a and 503b, in first residue chamber, 535, of the first vessel. The combined residue gas then ultimately exits the assembly through residue outlet port, 512.

The first vessel, 501, shown in FIG. 5 includes an optional third liquid removal stage, 523. Any additional liquid present in the gas can be withdrawn through third liquid outlet, 528, which is typically triggered by optional third float switch, 527, before the gas reaches membrane chamber, 526.

For shipping purposes, the filter stages, 520 and 521, and membrane chamber, 526, can be shipped as two portions, then assembled on-site. In an alternative embodiment, the membrane chamber, 526, can be the vertical portion, and the filter stages, 520 and 521, the horizontal portion.

Figure 6:
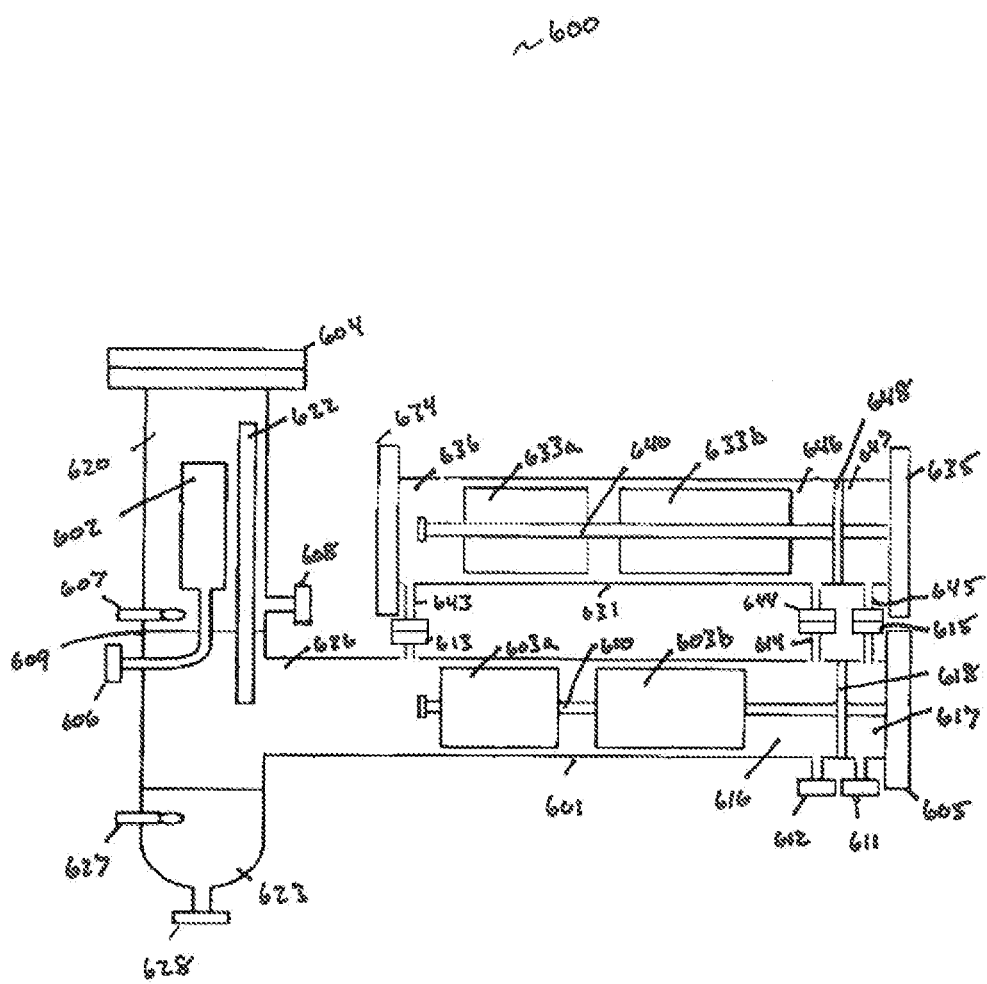
FIG. 6 is a cross-sectional view of an L-shaped, single-stage filter/membrane separation assembly in accordance with the invention.

FIG. 6 is a cross-sectional view of an assembly, 600, comprising an L-shaped, single-stage filter/membrane separation vessel, 601, and a membrane separation vessel, 631, in accordance with the invention. The first vessel, 601, shown in FIG. 6 has one stage for liquid removal, 620, with an optional second liquid removal stage, 623, and a membrane chamber, 626, which contains two membrane separation modules, 603a and 603b, all of which stages/chambers are contained within an L-shaped housing or vessel, 601.

The first vessel, 601, typically takes the form of a cylindrical shell equipped with two removable heads—604 and 605—one at each end of the vessel. Removable head, 604, allows the filter element, 602, to be removed and replaced or cleaned; correspondingly, removable head, 605, allows the membrane module(s), 603, to be removed and replaced or cleaned.

In addition to the elements described above, the first vessel, 601, typically includes the following basic components: feed inlet port, 606; feed nozzle, 613; float switch, 607; liquid outlet, 608; liquid-impermeable plate, 609; first permeate pipe, 610; first permeate nozzle, 615; first residue chamber, 616; first permeate chamber, 617; first removable gas-tight plate, 618; permeate outlet port, 611; first residue nozzle, 614; residue outlet port, 612; internal tube, 622; first feed/membrane chamber, 626; optional second float switch, 627; and optional second liquid outlet, 628.

The second vessel, 631, contains additional membrane modules, 633a and 633b, for carrying out parallel gas separation in conjunction with the membrane modules of the first vessel, 601. The second vessel also includes second removable heads, 634 and 635; second feed/membrane chamber, 636; second feed nozzle, 643; second permeate pipe, 640; second permeate nozzle, 645; second residue nozzle, 644; second gas-tight plate, 648; second residue chamber, 646; and second permeate chamber, 647. To all the feed gas, permeate gas, and residue gas to flow from vessel to vessel, second feed nozzle, 643, is connected to first feed nozzle, 613; second permeate nozzle, 645; is connected to first permeate nozzle, 615; and second residue nozzle, 644, is connected to first residue nozzle, 614.

In this particular embodiment, second vessel, 631, is located above first vessel, 601. In other embodiments, the second vessel may be located below first vessel, 601, or may be an intermediate vessel in a series of staked or aligned membrane separation vessels.

In operation, a gaseous feed stream flows into stage, 620, of vessel, 601, through inlet/feed port, 606. Stage, 620, comprises a filter, 602, in which any aerosolized droplets coalesce and are collected as liquids on plate, 609. When liquid builds up to a certain level on plate, 609, an optional first float switch, 607, triggers opening of liquid outlet, 608 (which is typically a valve as described above), that opens to release the entrapped liquid. Alternatively, opening of first liquid outlet, 608, can be triggered either manually, or by other appropriate automatic/automated means.

The remaining gas then passes into internal tube, 622, which connects stage, 620, to membrane chamber, 626, whence a portion of it flows as a feed stream to membrane modules, 603a and 603b. The membrane feed stream, which is typically at high pressure, flows across the feed surface of the membranes in the membrane modules, 603a and 603b. The permeate side of the membrane(s) is typically maintained at lower pressure to provide a driving force for transmembrane permeation. Permeating gas from membrane modules, 603a and 603b, passes through the membranes to permeate pipe, 610, whence it exits the assembly through permeate outlet, 611. Residue gas from the membrane modules, 603a and 603b, exits the assembly through residue outlet, 612.

The first vessel, 601, shown in FIG. 6 includes an optional second liquid removal stage, 623. Any additional liquid present in the gas can be withdrawn through second liquid outlet, 628, which is typically triggered by optional second float switch, 627, before the gas reaches membrane chamber, 626.

A second portion of the feed gas exits the first vessel through first feed nozzle, 613, and enters the second vessel via second feed nozzle, 643. The feed stream is typically at high pressure and is able to flow into second membrane chamber, 636, and across the feed surface of the membranes in the membrane modules, 633a and 633b. The permeate side of the membranes is typically maintained at lower pressure to provide a driving force for transmembrane permeation. Permeating gas from membrane modules, 633a and 633b, passes through the membranes to second permeate pipe, 640, and is collected in second permeate chamber, 647. Residue gas from membrane modules, 633a and 633b, is collected in second residue chamber, 646

Permeate gas exits the second vessel, 631, through second permeate nozzle, 645, and is combined with the permeate gas from membrane modules, 603a and 603b, in first permeate chamber, 617, of the first vessel. The combined permeate gas then ultimately exits the assembly through permeate outlet port, 611. Similarly, residue gas exits the second vessel, 631, through second residue nozzle, 644, and is combined with the residue gas from membrane modules, 603a and 603b, in first residue chamber, 616, of the first vessel. The combined residue gas then ultimately exits the assembly through residue outlet port, 612.

In summary, in its most basic form, the invention is a membrane separation assembly in which the filter element and membrane module(s) are housed within a common vessel, and where internal components of the vessel are configured in such a manner as to allow liquids to be trapped and removed from the vessel, and gases to flow to and through the membrane modules of that vessel and other membrane modules in connected vessels.

Applicants have described and illustrated various specific embodiments of the subject invention, from which those of skill in the art will be able to devise other variants without departing from the scope of the invention.

I claim:

1. A gas separation assembly, comprising,
   (a) a first vessel housing at least the following components:
      (i) a filter element,
      (ii) a first membrane module containing a gas separation membrane selective between methane and $C_{2+}$ hydrocarbons; the membrane module having a feed side and a permeate side,
      wherein the first vessel includes:
      (i) a feed inlet port in fluid communication with the filter element,
      (ii) at least one liquid outlet,
      (iii) means for allowing access to the filter element,
      (iv) means for allowing access to the first membrane module,
      (v) means for directing a filtered gas stream to the feed side,
      (vi) a first feed nozzle;
      (vii) a first permeate nozzle, and
      (viii) a first residue nozzle,
   (b) a second vessel housing a second membrane module containing a gas separation membrane selective between methane and $C_{2+}$ hydrocarbons; the membrane module having a feed side and a permeate side,
      wherein the second vessel includes:
      (i) a second feed nozzle in fluid communication with the first feed nozzle of the first vessel,
      (ii) a second residue nozzle in fluid communication with the first residue nozzle of the first vessel,
      (iii) a second permeate nozzle in fluid communication with the first permeate nozzle of the first vessel, and
      (iv) means for allowing access to the second membrane module;
   (c) a residue outlet port through which treated residue gas may exit the assembly; and
   (d) a permeate outlet port through which treated permeate gas may exit the assembly.

2. A gas separation assembly in accordance with claim 1, wherein the first and second membrane modules are spiral-wound modules.

3. A gas separation assembly in accordance with claim 1, wherein the means for allowing access to the filter element is a removable head or flange.

4. A gas separation assembly in accordance with claim 1, wherein the means for allowing access to the membrane modules is a removable head or flange.

5. A gas separation assembly in accordance with claim 1, wherein the first vessel further includes a permeate pipe that runs the length of the membrane module and is in fluid communication with the first permeate nozzle.

6. A gas separation assembly in accordance with claim 1, wherein the second vessel further includes a permeate pipe that runs the length of the membrane modules and is in fluid communication with the second permeate nozzle.

7. A gas separation assembly in accordance with claim 1, wherein the first or second vessels are adapted to house multiple membrane modules.

8. A gas separation assembly in accordance with claim 1, wherein the apparatus is adapted to be operable in a substantially vertical orientation, such that the first and second vessels have a top and a bottom.

9. A gas separation assembly in accordance with claim 8, wherein the filter element is below the first membrane module, and the liquid outlet is proximate to the bottom of the first vessel.

10. A gas separation assembly in accordance with claim 8, wherein the filter element is above the first membrane module, and the liquid outlet is proximate to the top of the first vessel.

11. A gas separation assembly in accordance with claim 10, wherein the assembly is adapted to remove liquids in two stages from a gaseous feed stream.

12. A gas separation assembly in accordance with claim 1, wherein the assembly is adapted to be operable in a substantially horizontal orientation.

13. A gas separation assembly in accordance with claim 12, wherein the apparatus is adapted to remove liquids in two stages from a gaseous feed stream.

14. A gas separation assembly in accordance with claim 1, wherein the first vessel has an L-shaped configuration.

15. A gas separation assembly in accordance with claim 14, wherein the first vessel is adapted to house three or more first membrane modules.

16. A gas separation assembly in accordance with claim 1, wherein the assembly is a fuel gas conditioning unit.

17. A gas separation assembly in accordance with claim 16, wherein the first and second membrane modules contain gas separation membranes that are preferentially permeable to methane over $C_{2+}$ hydrocarbons.

18. A gas separation assembly in accordance with claim 16, wherein the first and second membrane modules contain gas separation membranes that are preferentially permeable to $C_{2+}$ hydrocarbons over methane.

19. A gas separation assembly in accordance with claim 1, wherein the first vessel further comprises a first feed/membrane chamber connected to the first feed nozzle, a first residue chamber connected to the first residue nozzle, and a first permeate chamber connected to the first permeate nozzle.

20. A gas separation assembly in accordance with claim 19, wherein the residue outlet port is connected to the first residue chamber and the permeate outlet port is connected to the first permeate chamber of the first vessel.

21. A gas separation assembly in accordance with claim 19, wherein the first residue chamber and the first permeate chamber are adjacent to each other within the first vessel and separated by a first removable gas-tight plate.

22. A gas separation assembly in accordance with claim 1, wherein the second vessel further comprises a second feed/membrane chamber connected to the second feed nozzle, a second residue chamber connected to the second residue nozzle, and a second permeate chamber connected to the second permeate nozzle.

23. A gas separation assembly in accordance with claim 22, wherein the residue outlet port is connected to the second residue chamber and the permeate outlet port is connected to the second permeate chamber of the second vessel.

24. A gas separation assembly in accordance with claim 22, wherein the second residue chamber and the second permeate chamber are adjacent to each other within the second vessel and separated by a second removable gas-tight plate.

25. A gas separation assembly in accordance with claim 1, wherein the second vessel further comprises a third feed nozzle, a third permeate nozzle, and a third residue nozzle.

26. A gas separation assembly in accordance with claim 25, further comprising a third vessel housing a third membrane module containing a gas separation membrane selective between methane and $C_{2+}$ hydrocarbons;
   wherein the third vessel includes:
      (i) a fourth feed nozzle in fluid communication with the third feed nozzle of the second vessel,
      (ii) a fourth residue nozzle in fluid communication with the third residue nozzle of the second vessel, (iii) a fourth permeate nozzle in fluid communication with the third permeate nozzle of the second vessel, and
(iv) means for allowing access to the third membrane module.

27. A gas separation assembly in accordance with claim 26, wherein the means for allowing access to the third membrane modules of the third vessel includes a removable head or flange.

28. A gas separation assembly in accordance with claim 1, wherein the first vessel further comprises a third feed nozzle, a third residue nozzle, and a third permeate nozzle.

29. A gas separation assembly in accordance with claim 28, further comprising a third vessel housing a third membrane module containing a gas separation membrane selective between methane and $C_{2+}$ hydrocarbons;
wherein the third vessel includes:
(i) a fourth feed nozzle in fluid communication with the third feed nozzle of the first vessel,
(ii) a fourth residue nozzle in fluid communication with the third residue nozzle of the first vessel,
(iii) a fourth permeate nozzle in fluid communication with the third permeate nozzle of the first vessel, and
(iv) means for allowing access to the third membrane module.

30. A gas separation assembly in accordance with claim 29, wherein the third vessel further comprises a fifth feed nozzle, a fifth residue nozzle, and a fifth permeate nozzle.

31. A gas separation assembly in accordance with claim 1, wherein the residue outlet port and permeate outlet port are positioned on two different vessels within the assembly.

32. A gas separation assembly in accordance with claim 1, wherein the second vessel is further connected to a plurality of other vessels in fluid communication with each other by corresponding feed, residue and permeate nozzles,
wherein each other vessel houses at least one membrane module containing a gas separation membrane selective between methane and $C_{2+}$ hydrocarbons.

* * * * *